(12) United States Patent
Bradley, II

(10) Patent No.: US 10,054,152 B2
(45) Date of Patent: Aug. 21, 2018

(54) CONTROL CABLE MOUNTING AND ADJUSTMENT SYSTEM

(71) Applicant: KONGSBERG AUTOMOTIVE INC., Novi, MI (US)

(72) Inventor: Robert Allen Bradley, II, Selmer, TN (US)

(73) Assignee: KONGSBERG AUTOMOTIVE INC., Novi, MI (US)

( * ) Notice: Subject to any disclaimer, the term of this patent is extended or adjusted under 35 U.S.C. 154(b) by 17 days.

(21) Appl. No.: 15/066,344

(22) Filed: Mar. 10, 2016

(65) Prior Publication Data

US 2017/0261027 A1    Sep. 14, 2017

(51) Int. Cl.
| | |
|---|---|
| *F16C 1/22* | (2006.01) |
| *B60R 16/02* | (2006.01) |
| *F16C 1/10* | (2006.01) |
| *F16C 1/26* | (2006.01) |

(52) U.S. Cl.
CPC .......... *F16C 1/223* (2013.01); *B60R 16/0215* (2013.01); *F16C 1/102* (2013.01); *F16C 1/226* (2013.01); *F16C 1/262* (2013.01); *F16C 2310/00* (2013.01)

(58) Field of Classification Search
CPC .. F16C 1/102; F16C 1/105; F16C 1/20; F16C 1/22; F16C 1/223; F16C 1/26; F16C 1/226; F16C 1/262; F16C 2310/00; F16D 2125/62; Y10T 74/20408; Y10T 74/2045; Y10T 74/20462; B60R 16/0215
See application file for complete search history.

(56) References Cited

U.S. PATENT DOCUMENTS 2,780,324 A * 2/1957 O'Boyle ............ B61H 15/0021
                                                     188/107
4,669,330 A    6/1987 Stocker
(Continued)

FOREIGN PATENT DOCUMENTS

| DE | 29711360 U1 * | 9/1997 | ................ F16C 1/14 |
| FR | 2921450 A1 * | 3/2009 | ................ F16C 1/22 |
| FR | 2922614 A1 * | 4/2009 | ................ F16C 1/14 |

OTHER PUBLICATIONS

Extended European Search Report issued in related EP Application No. 17159294.2 dated May 9, 2017, 7 pages.

*Primary Examiner* — Adam D Rogers
(74) *Attorney, Agent, or Firm* — Cantor Colburn LLP

(57) ABSTRACT

A control cable positioning, retaining and adjusting system, for mounting a sheathed cable assembly to a frame member, comprises a cable assembly housing having an axially extending, toothed region extending along at least a part of its length, a mounting bracket configured to supportingly receive the cable assembly housing and having an adjustment window to display the toothed region there-through. A cable assembly adjusting lever is mounted to the cable assembly receiver and has a first end comprising an actuator, a second end having a locking tooth extending therefrom and a mid-portion mounted to the cable assembly receiver such that the lever is pivotable thereabout, wherein the cable assembly adjusting lever is positioned such that the locking tooth engages the axially extending, toothed region of the cable assembly housing through the adjustment window or opening.

12 Claims, 2 Drawing Sheets

(56) References Cited

U.S. PATENT DOCUMENTS

| | | | |
|---|---|---|---|
| 4,884,468 A * | 12/1989 | Muramatsu | F16C 1/101 |
| | | | 403/316 |
| 5,142,933 A | 9/1992 | Kelley | |
| 5,261,293 A | 11/1993 | Kelley | |
| 5,634,379 A | 6/1997 | Barnard | |
| 5,803,654 A | 9/1998 | Spease et al. | |
| 5,842,552 A * | 12/1998 | Colber, Jr. | A01D 34/6806 |
| | | | 192/111.12 |
| 2008/0257093 A1 | 10/2008 | Cox et al. | |

* cited by examiner

CONTROL CABLE MOUNTING AND ADJUSTMENT SYSTEM

FIELD OF THE INVENTION

The subject of the invention relates to control cable mounting systems and, more particularly, to control cable mounting systems for use with a frame member along which one or more control cables is guided, positioned, adjusted and retained.

BACKGROUND

In many devices the operation of a remote system or a subsystem is through the operation of an axial force on a control cable. The control cable may be contained within an outer sheath or conduit that allows the control cable to move axially along a predetermined path in a relatively unrestricted manner. Examples of such cable control systems or subsystems are (a) small engine throttle controls, (b) bicycle brake systems, (c) lawn mower clutch systems, (d) automotive seat release mechanisms, and (e) automotive panel release mechanisms. In such applications the control cable moves within the outer sheath or conduit and applies an actuating force to a remotely located device or system. Retention of the outer sheath or conduit is necessary in most cases in order to render the control cable operable.

The fixed positioning, adjustment and retention of a control cable and its sheath on a frame member has often been accomplished through a clamping member that may utilize bolts, nuts and adjusting knobs that function to hold the control cable assembly (i.e. the control cable and sheath), in place relative to the frame member, as well as the remotely located device or system; with some degree of disassembly typically required to adjust the control cable assembly once secured. These attaching methods and systems require multiple parts and operations that increase cost and complexity, while decreasing reliability. It is therefore desirable for a simple control cable positioning, adjusting and retaining system that will position and retain a control cable, and its outer sheath or conduit, relative to a frame member while providing for simple adjustment of the control cable assembly relative to a remotely controlled device or system.

SUMMARY

In an exemplary embodiment a control cable positioning, retaining and adjusting system, for mounting a sheathed cable assembly to a frame member, comprises a cable assembly housing having an axially extending, toothed region extending along at least a part of its length. A cable assembly receiver is configured to supportingly receive the cable assembly housing and has an adjustment window or opening to display the toothed region therethrough. A cable assembly adjusting lever is mounted to the cable assembly receiver and has a first end comprising an actuator, a second end comprising a locking tooth extending therefrom and a mid-portion pivotally mounted to the cable assembly receiver. The cable assembly adjusting lever is positioned such that the locking tooth engages the axially extending, toothed region of the cable assembly housing through the adjustment window or opening.

In another exemplary embodiment a control cable positioning, retaining and adjusting system, for mounting a sheathed cable assembly to a frame member, comprises a cable assembly housing. The housing comprises a tubular member having a first end that includes a cable receiver opening extending axially inwardly and terminating at a stop. A cable passage extends from the receiver opening stop, through the tubular member, to open through a second end. The cable receiver opening receives a first end of the cable assembly in a seated position against the stop with a cable, extending from the sheath, passing through the cable passage, to exit a second end. An axially extending, toothed region extends along at least a part of the length of the tubular member. A mounting bracket has an integrally formed, arcuate, flexible flange projecting from a centrally located body that is configured to extend about an exterior of the frame member to fix the control cable positioning, retaining and adjusting system to the frame member. A cable assembly receiver is integral with, and extends from, the mounting bracket, and is defined by axially separated bosses having through-bores configured to supportingly receive the tubular member of the cable assembly housing. An adjustment window or opening is defined between the axially separated bosses to display the toothed region when the cable assembly housing is received in the cable assembly receiver. A cable assembly adjusting lever is mounted to the centrally located body and has a first end comprising an actuator, a second end having a locking tooth extending therefrom and a mid-portion mounted to the cable assembly receiver such that the lever is pivotable thereabout. The cable assembly adjusting lever is positioned such that the locking tooth engages the axially extending, toothed region of the tubular member through the adjustment window or opening.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
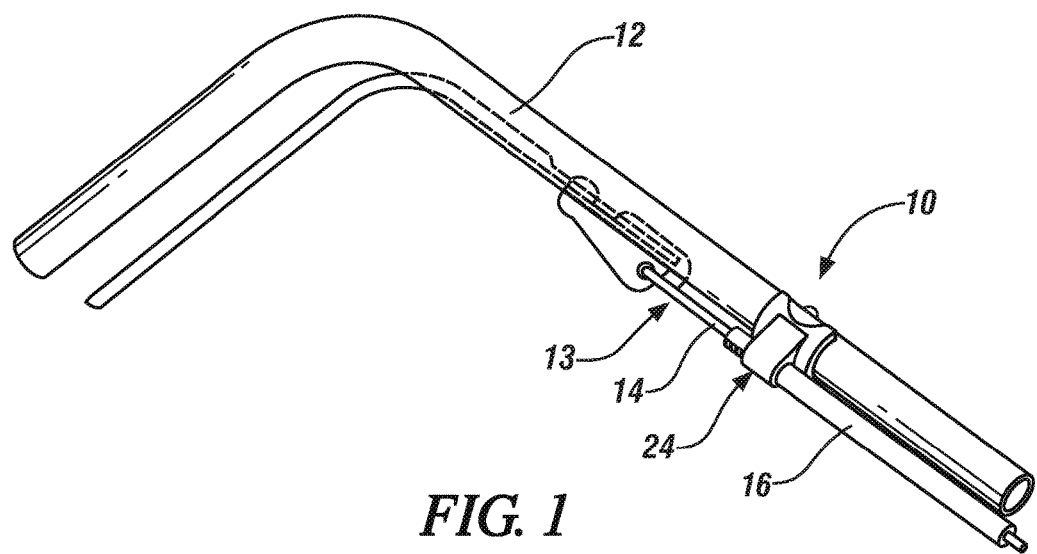
FIG. 1 is a partial, perspective view of a frame member and a control cable mounting and adjustment system embodying features of the invention.

The following description is merely exemplary in nature and is not intended to limit the disclosure, its application or uses. It should be understood that throughout the drawings, corresponding reference numerals indicate like or corresponding parts or features.

In accordance with an exemplary embodiment, FIG. 1 illustrates a control cable positioning, retaining and adjusting system 10 mounted to a frame member 12. The frame member may be associated with any number of systems such as a lawn mower, a bicycle, an automotive seating system or other systems requiring the control cable application of an actuating force to a remotely located device or system (not shown). The control cable adjusting system 10 comprises a cable assembly 13 that includes a cable 14 that is moveably disposed within a sheath or conduit 16.

Figure 2:
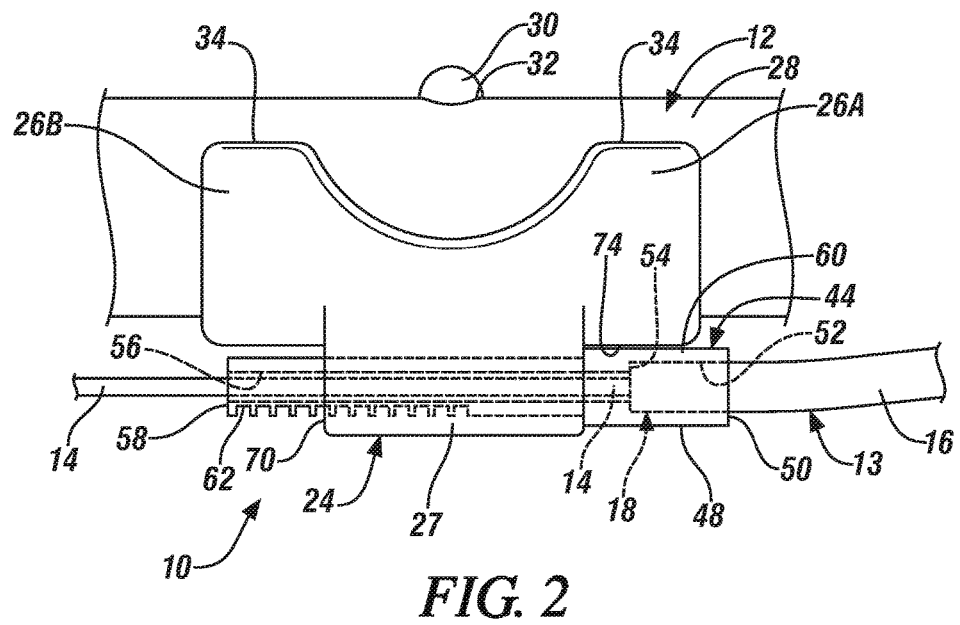
FIG. 2 is a partial, side view of the frame member of FIG. 1 taken from a first angle.
Figure 3:
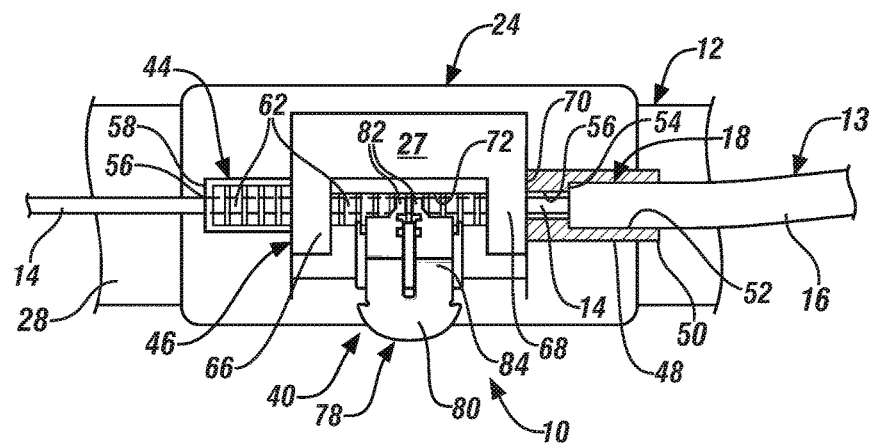
FIG. 3 is a partial, side view of the frame member of FIG. 1 taken from a second angle.

Referring to FIGS. 2 and 3, with continuing reference to FIG. 1, the outer sheath or conduit 16 has a first end 18 through which the cable 14 exits. An end fitting (not shown) may be crimped on the outer sheath or conduit 16, spun on, or attached by a variety of other methods; or the conduit may lack this feature. The control cable positioning, retaining and adjusting system 10 may comprise a mounting bracket 24 having at least one, or in the embodiment described, a pair of integrally formed, spaced-apart flexible flanges 26A and 26B, projecting from a centrally located body 27. The flanges are configured to extend about the exterior of the frame member 12 to firmly hold the control cable positioning, retaining and adjusting system 10 to the frame member. The flanges 26A and 26B prevent the control cable system 10 from moving away from the frame member 12. Slippage of the control cable system 10 along the outer surface 28 of the frame member 12, either axially or circumferentially, may be prevented by a central post member 30 that extends radially inwardly from the centrally located body 27 and into an opening 32 in the frame member 12. The terminal ends 34 of the spaced-apart flexible flanges 26A and 26B of the mounting bracket 24 include a sufficient space therebetween to allow them to be snapped in place about the frame member 12 as the central post member 30 is inserted into the opening 32. The mounting bracket 24 may be molded of a composite material such as a nylon or a polypropylene, for example, that allows the spaced-apart flexible flanges 26A and 26B to resiliently flex apart during insertion of the control cable positioning, retaining and adjusting system 10 onto the frame member 12 and subsequently return to a clamped position about the frame member. It is contemplated that the mounting bracket 24, and corresponding spaced-apart flexible flanges 26A and 26B, may comprise numerous configurations allowing the bracket to attach to virtually any configuration of frame member 12 such as, for example, frame members having round, oval, square, rectangular or other cross-sections. In addition it is contemplated that the invention is also applicable to brackets that may not necessarily be configured to "snap-on" to the frame member 12, as illustrated, but may attach to the frame member in a more conventional manner using fasteners or other suitable attaching means.

Figure 4:
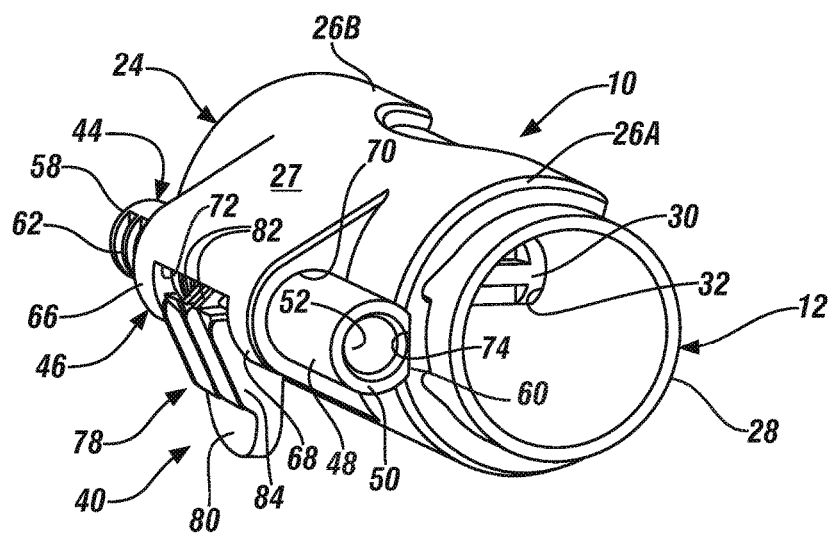
FIG. 4 is a partial, perspective view of the frame member of FIG. 1.

The cable assembly 13 mounts to the mounting bracket 24, of the control cable positioning, retaining and adjusting system 10, via a cable-bracket interface 40. Referring to FIGS. 3 and 4, in an embodiment, the cable-bracket interface 40 may comprise a cable assembly housing 44, configured to receive the first end 18 of the cable assembly 13, and a cable assembly receiver 46 integral with, and extending from, the mounting bracket 24. The cable assembly housing 44 may comprise a tubular member 48 having a first end 50 that includes a cable receiver opening 52 extending axially inwardly and terminating at a stop 54. A cable passage 56 extends from the stop 54 through the tubular member 48 and opens through a second end 58 thereof. The cable receiver opening 52 receives the first end 18 of the cable assembly 13 such that the sheath 16 seats against the stop 54. The cable 14, extending from the sheath 16, passes through and out of the cable passage 56, of the cable assembly housing 44, to terminate at a remotely located device or system (not shown). The tubular member 48 may include a keyed or flat portion 60 and an axially extending, toothed region 62 extending along at least a portion of its length.

In an embodiment, the cable assembly receiver 46 is defined by axially separated bosses 66 and 68 having through-bores 70 that are configured to supportingly receive the tubular member 48 of the cable assembly housing 44. An adjustment window or opening 72 is defined between the bosses 66 and 68. When supported in the cable assembly receiver 46, the cable assembly housing 44 displays the toothed region 62 there-through. The keyed or flat portion 60, of the tubular member 48, engages with a corresponding positioning feature 74 to position the toothed region 62 in the adjustment window or opening 72 when the tubular member 48 is inserted into the cable assembly receiver 46.

In an embodiment, a cable assembly adjusting lever 78 is mounted to the centrally located body 27 of the cable assembly receiver 46. The lever includes a first end comprising an actuator 80 and a second end having a locking tooth or teeth 82 extending therefrom. A mid-portion 84 is mounted to the cable assembly receiver such that the lever 78 is pivotable thereabout. The cable assembly adjusting lever is positioned such that the locking tooth or teeth 82 engage the axially extending, toothed region 62 of the tubular member 48 when the cable assembly housing 44 is inserted into the through-bores 70 of the cable assembly receiver 46. The engagement of the locking tooth or teeth 82 with the toothed region 62 locks the cable assembly housing in place axially, relative to the cable assembly receiver and, importantly, relative to the a remotely located device or system (not shown). In an embodiment, the cable assembly adjusting lever 78 may be integrally constructed with the mounting bracket 24. Such construction may be achieved by molding the lever 78 as part of the mounting bracket. In another embodiment, it is contemplated that the cable assembly adjusting lever 78 may be a separate assembly that is fixed to the mounting bracket 24 through a fastener or a hinge assembly, for example.

In operation, the mounting bracket 24 is installed onto the frame member 12 as described herein. The cable assembly 13 is inserted into the cable receiver opening 52 until the cable sheath 16 seats against the stop 54 and the cable 14 extends through the cable passage 56 and exits the second end 58 of the tubular member. The cable assembly housing 44 is inserted into the through-bores 70 of the cable assembly receiver 46 and is positioned by engagement of the keyed or flat portion 60 with the corresponding positioning feature 74 to present the axially extending toothed region 62 of the tubular member 48 through the adjustment window or opening 72; allowing engagement with the locking tooth or teeth 82 of the cable assembly adjusting lever 78. When the cable force or travel exerted on the remotely located device or system (not shown) requires adjustment, the actuator 80 of the cable assembly adjusting lever 78 is depressed, causing the lever to pivot about the mid-portion 84 to temporarily disengage the locking tooth or teeth 82 from the axially extending toothed region 62 of the cable assembly housing 44. The cable assembly housing is moved axially to re-position the end 18 of the sheath or conduit 16. Once the cable assembly is repositioned, the actuator 80 is released causing the lever 78 to pivot about the mid-portion 84 to re-engage the locking tooth or teeth 82 with the axially extending toothed region 62 of the cable assembly housing 44. It is contemplated that the cable assembly adjusting lever 78 is normally biased in a direction that will maintain the locking tooth or teeth 82 engaged with the toothed region 62.

Figure 5:
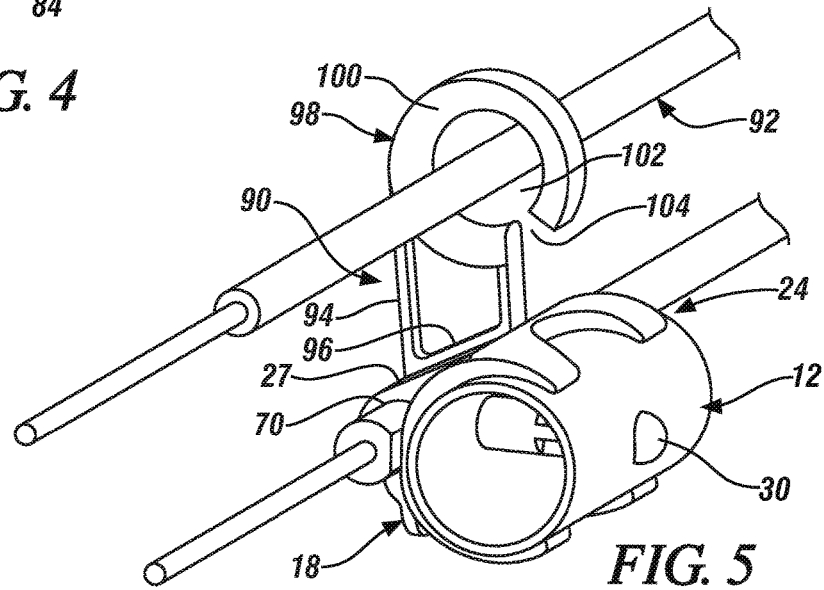
FIG. 5 is a partial perspective view of an alternative frame member and control cable mounting and adjustment system embodying features of the invention.

Referring to FIG. 5, in an alternative embodiment, a cable keeper 90 is formed on, and extends from, the centrally located body 27 of the mounting bracket 24. It should be understood that while one cable keeper 90 is illustrated as extending from the body 27 of the mounting bracket 24, the cable keeper may extend from other portions of the mounting bracket 24 and, more than one cable keeper 90 may be used. The cable keeper 90 may be utilized when it is necessary to locate a second cable assembly 92 adjacent to the frame member 12. The cable keeper 90 comprises a base portion 94 having a first proximate end 96 fixed to the body 27 and a second, distal end 98 terminating in a hooked portion 100 that defines a cable holding portion 102 and a cable opening 104 adapted to receive a cable therethrough. In one embodiment, the cable opening may be smaller than the outer diameter of the second cable assembly 92 if the cable keeper is constructed of flexible material that allows the cable opening 104 to be flexed open during insertion of the second cable assembly 92. While a hooked configuration has been described, it should be understood that any number of configurations are contemplated without deviating from the scope of the invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A control cable positioning, retaining and adjusting system, for mounting a sheathed cable assembly to a frame member, comprising:
   a cable assembly housing having an axially extending, toothed region;
   a cable assembly receiver configured to receive the cable assembly housing and having an adjustment window or opening to display the toothed region therethrough;
   a cable assembly adjusting lever, mounted to the cable assembly receiver, having a first end comprising an actuator, a second end comprising a locking tooth extending therefrom and a mid-portion pivotally mounted to the cable assembly receiver, the cable assembly adjusting lever positioned such that the locking tooth directly engages at least one tooth of the axially extending, toothed region of the cable assembly housing through the adjustment window or opening; and
   a mounting bracket, integral with the cable assembly receiver, comprising an integrally formed, arcuate, flexible flange projecting from a centrally located body and configured to extend about an exterior of the frame member to fix the control cable positioning, retaining and adjusting system to the frame member, the mounting bracket further comprising a central post member that extends radially inwardly from the centrally located body and into an opening in the frame member to fix the mounting bracket axially and circumferentially relative to the frame member.

2. The control cable positioning, retaining and adjusting system of claim 1, the cable assembly housing further comprising:
   a tubular member having a first end that includes a cable receiver opening extending axially inwardly and terminating at a stop; and
   a cable passage, extending from the stop through the tubular member, to open through a second end, wherein the cable receiver opening receives a first end of the cable assembly and a cable sheath seats against the stop and a cable extends through the cable passage to exit a second end of the tubular member.

3. The control cable positioning, retaining and adjusting system of claim 1, further comprising a cable keeper formed on and extending from the centrally located body.

4. The control cable positioning, retaining and adjusting system of claim 3, wherein the cable keeper comprises a base portion having a first proximate end fixed to the centrally located body and a second, distal end terminating in a cable holding portion having a cable opening adapted to receive a cable therethrough.

5. A control cable positioning, retaining and adjusting system, for mounting a sheathed cable assembly to a frame member, comprising:
   a cable assembly housing comprising:
      a tubular member having a first end that includes a cable receiver opening extending axially inwardly and terminating at a stop and an axially extending, toothed region; and
      a cable passage extending from the stop, through the tubular member, to open through a second end, wherein the cable receiver opening receives a first end of the cable assembly and a cable sheath seats against the stop with a cable extending from the cable sheath passing through the cable passage, to exit a second end of the tubular member;
   a mounting bracket having an integrally formed, arcuate, flexible flange projecting from a centrally located body, and configured to extend about an exterior of the frame member to fix the control cable positioning, retaining and adjusting system to the frame member, the mounting bracket further comprising a central post member that extends radially inwardly from the centrally located body and into an opening in the frame member to fix the mounting bracket axially and circumferentially relative to the frame member;
   a cable assembly receiver integral with, and extending from, the mounting bracket, and defined by axially separated bosses having through-bores configured to receive the tubular member of the cable assembly housing;
   an adjustment window or opening defined between the axially separated bosses to display the toothed region therethrough when the cable assembly housing is received in the cable assembly receiver; and
   a cable assembly adjusting lever mounted to the centrally located body having a first end comprising an actuator, a second end having a locking tooth extending therefrom and a mid-portion mounted to the cable assembly receiver such that the lever is pivotable thereabout, the cable assembly adjusting lever positioned such that the locking tooth engages at least one tooth of the axially extending toothed region of the tubular member through the adjustment window or opening.

6. The control cable positioning, retaining and adjusting system of claim 5, the cable assembly housing further comprising a keyed or flat portion engageable with a corresponding positioning feature of the cable assembly receiver to position the cable assembly housing therein.

7. The control cable positioning, retaining and adjusting system of claim 6, wherein positioning of the cable assembly housing within the cable assembly receiver presents the toothed region through the adjustment window or opening.

8. The control cable positioning, retaining and adjusting system of claim 5, wherein engagement of the locking tooth with the toothed region locks the cable assembly housing axially in place relative to the cable assembly receiver.

9. The control cable positioning, retaining and adjusting system of claim 5, wherein engagement of the locking tooth with the toothed region locks the cable assembly housing axially in place relative to the frame member.

10. The control cable positioning, retaining and adjusting system of claim 5, wherein the mounting bracket is constructed of a composite comprising one of a nylon or a polypropylene.

11. The control cable positioning, retaining and adjusting system of claim 5, further comprising a cable keeper formed on and extending from the centrally located body of the mounting bracket.

12. The control cable positioning, retaining and adjusting system of claim 11, wherein the cable keeper comprises a base portion having a first proximate end fixed to the centrally located body and a second, distal end terminating in a cable holding portion having a cable opening adapted to receive the cable therethrough.

* * * * *